No. 783,217. PATENTED FEB. 21, 1905.
J. B. MORONY.
DEVICE FOR CONTROLLING HORSES.
APPLICATION FILED APR. 30, 1903.
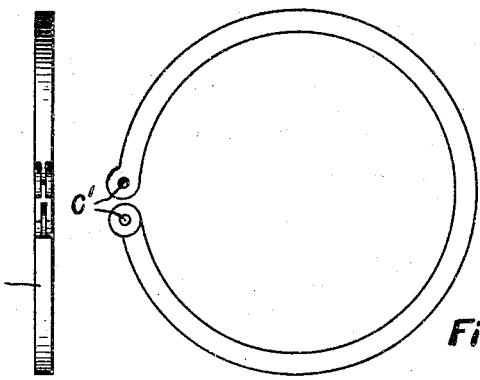
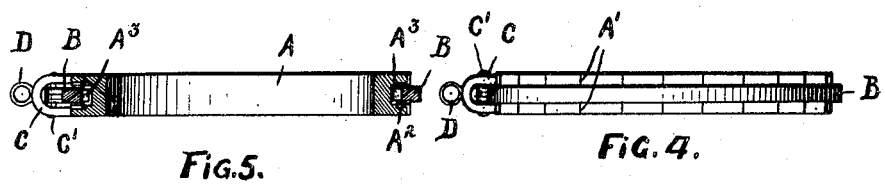
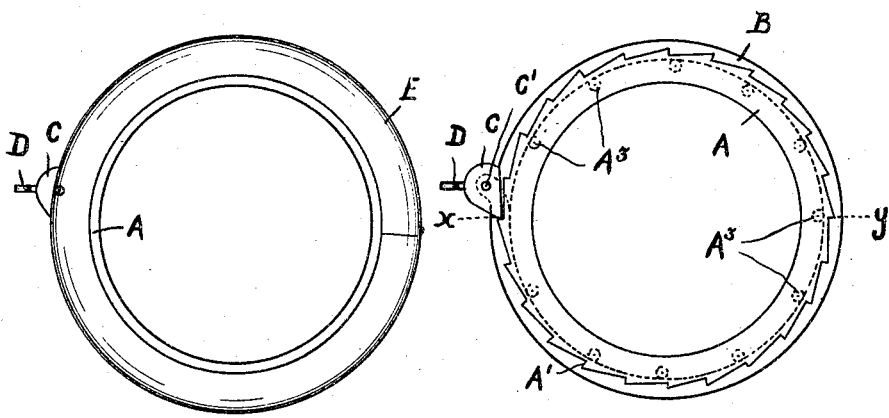
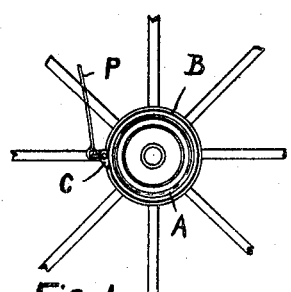
Witnesses.
Inventor.
John Bede Morony No. 783,217.

Patented February 21, 1905.

UNITED STATES PATENT OFFICE.

JOHN BEDE MORONY, OF MUDGEE, NEW SOUTH WALES, AUSTRALIA.

DEVICE FOR CONTROLLING HORSES.

SPECIFICATION forming part of Letters Patent No. 783,217, dated February 21, 1905.

Application filed April 30, 1903. Serial No. 155,074.

*To all whom it may concern:*

Be it known that I, JOHN BEDE MORONY, a subject of the King of Great Britain, residing at the town of Mudgee, in the State of New South Wales, in the Commonwealth of Australia, have invented certain new and useful Improvements in Devices for Controlling Horses, of which the following is a specification.

My invention relates to improvements in a device for preventing horses and other animals attached to road-vehicles from starting or bolting.

This invention relates to improvements in vehicles, and has for its object to provide a device which when attached to the nave of one of the wheels and driving-reins attached thereto any forward motion of the horse will cause the reins to be wound round the nave of the wheel, and thus immediately check the progress of the horse.

The device is so constructed that should the horse propel the vehicle backward the strain is immediately removed from the reins; but as soon as he starts forward again the strain is renewed.

The device consists, essentially, of a circular rack or toothed ring, preferably of steel, which surrounds and is attached to the nave of one of the wheels of the vehicle, preferably in a position near the spokes. This toothed ring is provided on its face with an annular groove in which is fitted a light steel band adapted to revolve therein on roller or ball bearings and carrying a pivoted pawl which engages the teeth on the fixed ring.

In order that my invention may be clearly understood, I shall explain the same by reference to the accompanying sheet of drawings, in which—

Figure 1 is a side elevation showing the device in position on a wheel. Fig. 2 is an enlarged view of the device complete with dust-shield attached. Fig. 3 is a similar view of device with dust-cover removed. Fig. 4 is a side elevation of Fig. 3. Fig. 5 is a section through line X Y, Fig. 3. Figs. 6 and 7 are respectively an elevation and plan of revolving band.

A is fixed circular rack which is attached to the nave of the wheel, preferably by means of screws. A' represents teeth thereon.

B is light steel band which fits in the annular groove $A^2$ and revolves therein on roller-bearings $A^3$. Ball-bearings may be substituted, if desired.

C is pawl pivotally attached to the ring B at C', so that it engages the teeth of the fixed rack on each side thereof.

D is eyelet or pawl, to which the reins P are fastened.

E is dust-shield, which may be made of any suitable material, such as sheet-steel.

The method of operating my invention is as follows: When it is desired to leave a horse and vehicle without an attendant, the reins are fastened to the eyelet D either by means of a separate strap or buckled direct thereto. Should the horse start to move forward, the revolution of the vehicle-wheel causes the ring B and pawl C to also revolve, owing to the engagement of the latter with the fixed rack A. Thus the reins, which are attached to the eyelet D, are wound round the nave of the wheel and the forward motion of the horse immediately checked. Should the horse on feeling the tension of the reins back and cause the vehicle to move in the opposite direction, the tension on the reins will be immediately removed, as the pawl will ride over the teeth of the fixed rack when the vehicle is moved backward.

Having now particularly described and ascertained the nature of my said invention and in what manner the same is to be performed, I declare that what I claim is—

1. A device for attachment to vehicle-wheels comprising a circular rack adapted to be secured to the nave of the wheel and having an annular groove in the face thereof, a band rotatably mounted in said groove, a pawl pivotally attached to said band and engaging the rack and having at its outer end means for attaching the reins, substantially as described.

2. In combination with the hub of a road-vehicle, a circular rack secured thereto having an annular groove in its face, a circular band lying in said groove, a pawl pivoted to the band and engaging the rack on each side thereof and an eyelet carried by the pawl for the attachment of the reins, substantially as described.

Signed at Mudgee this 3d day of March, 1903.

JOHN BEDE MORONY.

Witnesses:
HERBT. CLARKE,
CLAUDE PHILLIMORE.